(12) United States Patent  
Kim et al.

(10) Patent No.: US 9,020,278 B2
(45) Date of Patent: Apr. 28, 2015

(54) CONVERSION OF CAMERA SETTINGS TO REFERENCE PICTURE

(71) Applicant: Samsung Electronics Co., Ltd., Suwon, Gyeonggi-Do (KR)

(72) Inventors: Byoungju Kim, Walnut Creek, CA (US); Prashant Desai, San Francisco, CA (US); Jesse Alvarez, Oakland, CA (US); JinHo Choi, Seoul (KR); TaeYoung Ha, Gyungki (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 13/830,487

(22) Filed: Mar. 14, 2013

(65) Prior Publication Data

US 2013/0330007 A1   Dec. 12, 2013

Related U.S. Application Data

(60) Provisional application No. 61/657,642, filed on Jun. 8, 2012.

(51) Int. Cl.
```
G06K 9/68      (2006.01)
G06K 9/46      (2006.01)
H04N 5/232     (2006.01)
G06K 9/00      (2006.01)
```

(52) U.S. Cl.
CPC .............. *G06K 9/46* (2013.01); *H04N 5/23293* (2013.01); *G06K 9/00671* (2013.01); *G06K 9/00677* (2013.01)

(58) Field of Classification Search
USPC .................. 382/100, 217, 218; 348/116, 161
See application file for complete search history.

(56) References Cited

U.S. PATENT DOCUMENTS

| | | | | |
|---|---|---|---|---|
| 6,370,568 | B1 * | 4/2002 | Garfinkle | 709/206 |
| 7,953,295 | B2 * | 5/2011 | Vincent et al. | 382/299 |
| 8,031,940 | B2 * | 10/2011 | Vincent et al. | 382/176 |
| 8,098,934 | B2 * | 1/2012 | Vincent et al. | 382/177 |
| 8,265,400 | B2 * | 9/2012 | Yadid et al. | 382/229 |
| 8,294,813 | B2 * | 10/2012 | Kawaguchi et al. | 348/371 |
| 8,379,912 | B2 * | 2/2013 | Yadid et al. | 382/100 |
| 8,385,593 | B2 * | 2/2013 | Urbach et al. | 382/100 |
| 8,531,514 | B2 * | 9/2013 | Shimizu et al. | 348/77 |
| 8,532,333 | B2 * | 9/2013 | Urbach et al. | 382/100 |

(Continued)

OTHER PUBLICATIONS

Anonymous, "Flickr", Feb. 10, 2004, Wikipedia, pp. 1-13, United States [downloaded from http://en.wikipedia.org/wiki/Flickr on Dec. 17, 2014].

(Continued)

*Primary Examiner* — Aaron W Carter
(74) *Attorney, Agent, or Firm* — Sherman IP LLP; Kenneth L. Sherman; Steven Laut (57) ABSTRACT

A method of using reference photo setting information for taking a photo image of a current framed image comprises displaying a framed image from an image capture device of an electronic device, performing object recognition for the framed image on a display of the electronic device, identifying location information for the electronic device, presenting one or more reference images related to the framed image based on one or more of the identified location information and object recognition, selecting one of the reference images, and using photo setting information used for capturing the selected reference image for capturing the framed image.

26 Claims, 5 Drawing Sheets

(56) References Cited

U.S. PATENT DOCUMENTS

| | | | |
|---|---|---|---|
| 8,726,324 B2* | 5/2014 | Tirpak et al. | 725/105 |
| 8,761,811 B2* | 6/2014 | Alonzo | 455/457 |
| 2005/0280661 A1* | 12/2005 | Kobayashi et al. | 345/633 |
| 2006/0002590 A1* | 1/2006 | Borak | 382/104 |
| 2007/0268392 A1* | 11/2007 | Paalasmaa et al. | 348/333.02 |
| 2008/0002916 A1* | 1/2008 | Vincent et al. | 382/305 |
| 2008/0069404 A1* | 3/2008 | Lee et al. | 382/106 |
| 2008/0239133 A1* | 10/2008 | Cazier et al. | 348/333.05 |
| 2008/0240694 A1* | 10/2008 | Okazaki | 396/50 |
| 2008/0268876 A1* | 10/2008 | Gelfand et al. | 455/457 |
| 2009/0324103 A1* | 12/2009 | Gelfand et al. | 382/224 |
| 2010/0149367 A1* | 6/2010 | Yim et al. | 348/222.1 |
| 2010/0194931 A1* | 8/2010 | Kawaguchi et al. | 348/240.99 |
| 2010/0245596 A1* | 9/2010 | Tirpak et al. | 348/207.1 |
| 2010/0290699 A1* | 11/2010 | Adam et al. | 382/155 |
| 2011/0069201 A1* | 3/2011 | Kawanishi et al. | 348/231.4 |
| 2011/0311140 A1* | 12/2011 | Urbach et al. | 382/182 |
| 2012/0020565 A1* | 1/2012 | Urbach et al. | 382/182 |
| 2012/0084323 A1* | 4/2012 | Epshtein et al. | 707/776 |
| 2013/0018881 A1* | 1/2013 | Bhatt | 707/736 |
| 2013/0138685 A1* | 5/2013 | Brucher et al. | 707/769 |
| 2013/0202209 A1* | 8/2013 | Ariyama | 382/190 |
| 2013/0286244 A1* | 10/2013 | Tirpak et al. | 348/222.1 |
| 2013/0288719 A1* | 10/2013 | Alonzo | 455/457 |
| 2013/0330007 A1* | 12/2013 | Kim et al. | 382/195 |

OTHER PUBLICATIONS

Anonymous, "Google Earth", Jun. 11, 2005, Wikipedia, pp. 1-36, United States [downloaded from http://en.wikipedia.org/wiki/Google_Earth on Dec. 17, 2014].

* cited by examiner

CONVERSION OF CAMERA SETTINGS TO REFERENCE PICTURE

CROSS-REFERENCE TO RELATED APPLICATIONS

This application claims the priority benefit of U.S. Provisional Patent Application Ser. No. 61/657,642, filed Jun. 8, 2012, incorporated herein by reference in its entirety.

TECHNICAL FIELD

One or more embodiments relate generally to taking photos and in particular to using reference photo setting information for taking a photo image of a current framed image on an electronic device.

BACKGROUND

With the proliferation of electronic devices such as mobile electronic devices, users are using the electronic devices for photo taking and editing. Users that want to recreate previous taken photographs must experiment to attempt to achieve the same photo qualities.

SUMMARY

One or more embodiments relate generally to using reference photo setting information for taking a photo image of a current framed image. One embodiment of provides using photo setting information used for capturing a selected reference image for capturing a current framed image.

In one embodiment, a method of using reference photo setting information for taking a photo image of a current framed image comprises displaying a framed image from an image capture device of an electronic device, performing object recognition for the framed image on a display of the electronic device, identifying location information for the electronic device, presenting one or more reference images related to the framed image based on one or more of the identified location information and object recognition, selecting one of the reference images, and using photo setting information used for capturing the selected reference image for capturing the framed image.

Another embodiment comprises an electronic device. The electronic device comprises an image capture device, a display and an imaging inspiration module. In one embodiment, the image inspiration module provides photo setting information used for capturing a reference photo image for capturing a current framed image via the image capture device of the electronic device. The imaging inspiration module identifies location information of the electronic device, performs object recognition of subject matter of the current framed image, searches for reference photo images related to the current framed image, and presents reference photo images found from the search for selection for providing the photo setting information used for capturing the reference photo image for capturing the current framed image.

One embodiment comprises a non-transitory computer-readable medium having instructions which when executed on a computer perform a method comprising displaying a framed image from an image capture device of an electronic device. Object recognition for the framed image is performed on a display of the electronic device. Location information for the electronic device is identified. One or more reference images related to the framed image is presented based on one or more of the identified location information and object recognition. One of the reference images is selected. Photo setting information used for capturing the selected reference image is used for capturing the framed image.

Another embodiment comprises graphical user interface (GUI) displayed on a display of an electronic device. The GUI comprising one or more selectable reference images related to a framed image obtained by an image capture device of the electronic device based on one or more of identified location information and object recognition. Upon selection of one of the reference images, photo setting information is displayed on the GUI.

These and other aspects and advantages of the embodiments will become apparent from the following detailed description, which, when taken in conjunction with the drawings, illustrate by way of example the principles of the embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

The following description is made for the purpose of illustrating the general principles of the embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to using an electronic device for using reference photo setting information for taking a photo image of a current framed image with an electronic device. One embodiment provides multiple reference photo selections.

In one embodiment, the electronic device comprises a mobile electronic device capable of data communication over a communication link such as a wireless communication link. Examples of such mobile device include a mobile phone device, a mobile tablet device, smart mobile devices, etc.

Figure 1A:
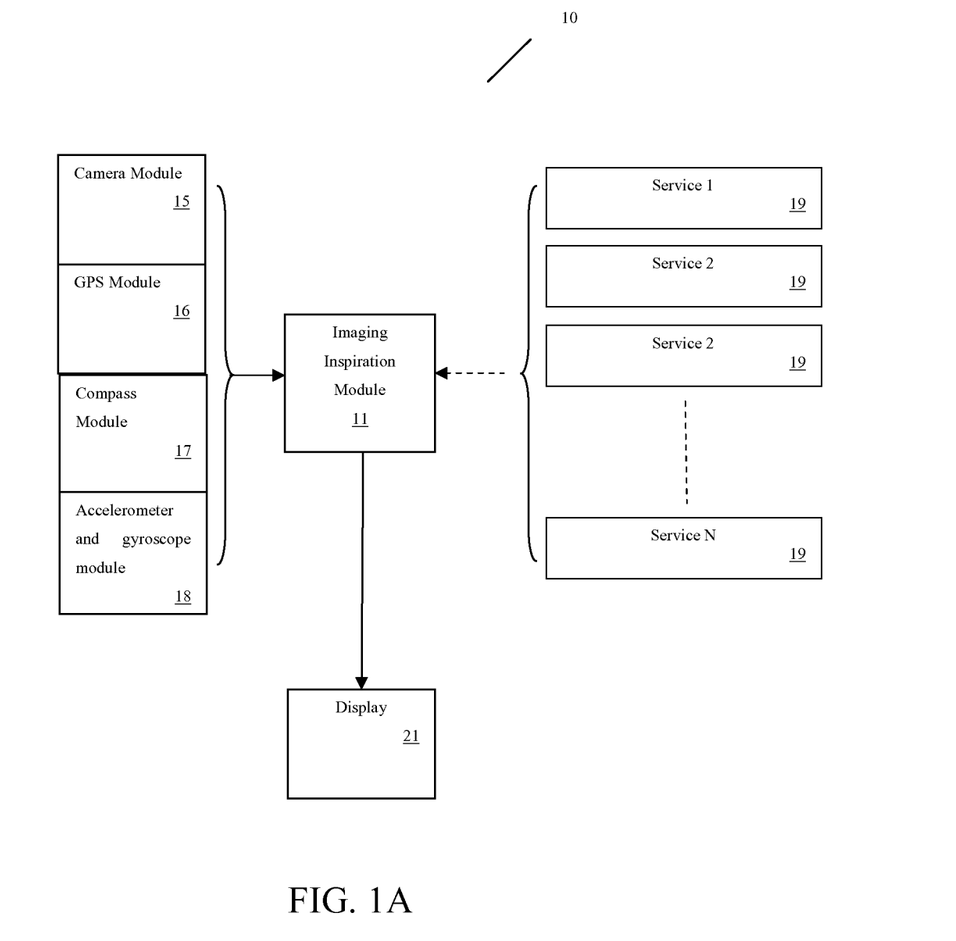
FIGS. 1A-1B show block diagrams of architecture on a system for using reference photo setting information for taking a photo image of a current framed image with an electronic device, according to an embodiment.
Figure 1B:
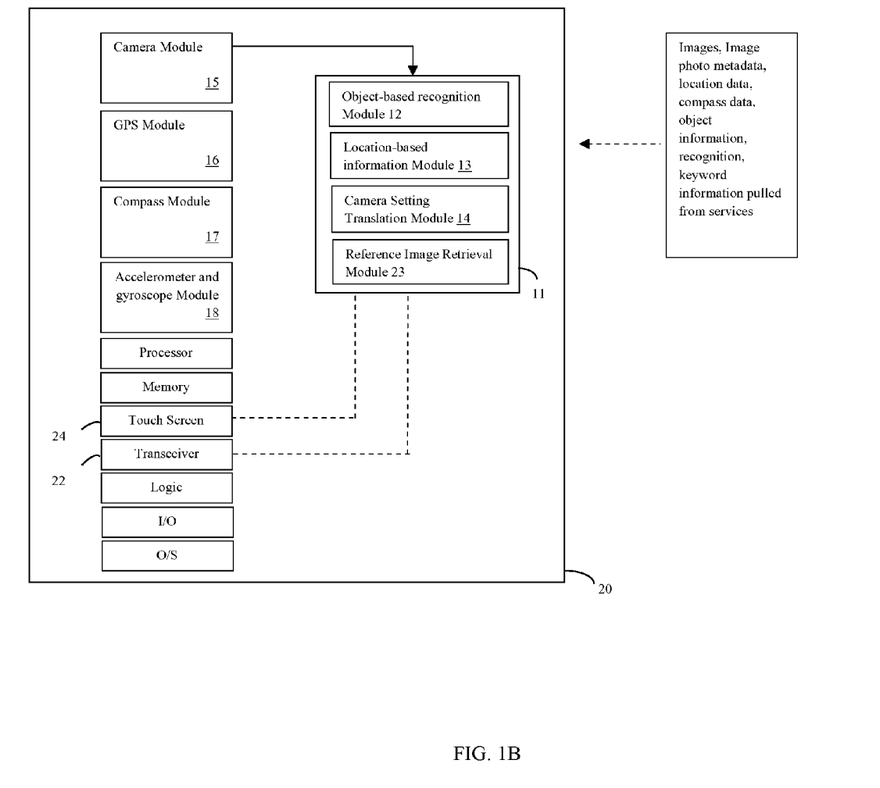

FIG. 1A shows a functional block diagram of an embodiment of a reference photo settings selection system 10, which provides reference photo setting information for use in taking a photo image of a current framed image with an electronic device (such as mobile device 20 as shown in FIG. 1B), according to an embodiment.

The system 10 comprises an imaging inspiration module 11 including an object-based recognition module 12 (FIG. 1B), a location-based information module 13 (FIG. 1B), a camera setting translation module 14 (FIG. 1B) and an image retrieval module 23 (FIG. 1B). The imaging inspiration module 11 utilizes mobile device hardware functionality including one or more of: an image capture device such as, e.g., a camera module 15, global positioning satellite (GPS) receiver module 16, compass module 17, and accelerometer and gyroscope module 18.

The camera module 15 is used to capture images of objects, such as people, surroundings, places, etc. The GPS module 16 is used to identify a current location of the mobile device 20 (i.e., user). The compass module 17 is used to identify direction of the mobile device. The accelerometer and gyroscope module 18 is used to identify tilt of the mobile device.

The system 10 determines current location and recognizes the subject matter currently being framed, and presents a row of related photo images on the display 21 of the mobile device 20 for selection and use of the selected image photo camera settings for taking a photo of the subject matter currently framed using an image capture device of the mobile device 20. The system 10 provides a simple, fluid, and responsive user experience.

Providing reference photo setting information for use in taking a photo image of a current framed image with an electronic device (such as mobile device 20 as shown in FIG. 1B) comprises integrating information including camera settings data (e.g., F-stop data, flash data, shutter speed data, lighting data, etc.), location data, sensor data (i.e., magnetic field, accelerometer, rotation vector), etc. For example, Google Android mobile operating system application programming interface (API) components providing such information may be employed.

In one embodiment, locating and obtaining images, image photo metadata, location data, compass data, object information, recognition, keyword information pulled from services 19 from sources, such as cloud environments, networks, servers, clients, mobile devices, etc. In one embodiment, the object-based recognition module 12 performs object recognition for objects being viewed in a current frame based on, for example, shape, size, outline, etc. in comparison of known objects stored, for example, in a database or storage depository.

In one embodiment, the location-based information module 13 obtains the location of the mobile device 20 using the GPS module 16 and the information from the object-based recognition module 12. For example, based on the GPS location information and object-recognition information, the location-based information module 13 may determine that the location and place of the current photo frame is a sports stadium (e.g., based on the GPS data and the recognized object, the venue may be determined). Similarly, if the current frame encompasses a famous statue, based on GPS data and object recognition, the statue may be recognized and location (including, elevation, angle, lighting, time of day, etc.) may be determined.

Additionally, rotational information from the accelerometer and gyroscope module 18 may be used to determine the position or angle of the image capture device of the electronic mobile device 20.

In one embodiment, the image retrieval module 23 uses the information obtained from the object-based recognition module 12 and the location-based information module 13 to search for similar preexisting photo images as compared to the current photo frame of an image capture device on the mobile electronic device 20 via multiple sources, such as photo databases, photographer databases, cloud storage facilities, etc. Once similar preexisting photos have been located, the mobile electronic device 20 obtains the preexisting photos and the respective camera settings metadata and pulls the information to the mobile electronic device 20 via the transceiver 22. The retrieved images are displayed on the display 21 as thumbnails in, for example, a row on a display. The user may then select an "inspirational" photo image and view the camera settings on the display 21 to determine whether to apply the same settings to the currently framed image.

In one embodiment, the camera setting translation module 14 analyzes the camera settings information from the preexisting photo metadata and determines whether the information needs to be translated to settings the camera module 15 understands and automatically changes the camera settings on the electronic mobile device 20. The user may then capture the currently framed image using the settings based on the selected preexisting photo image.

Figure 2A:
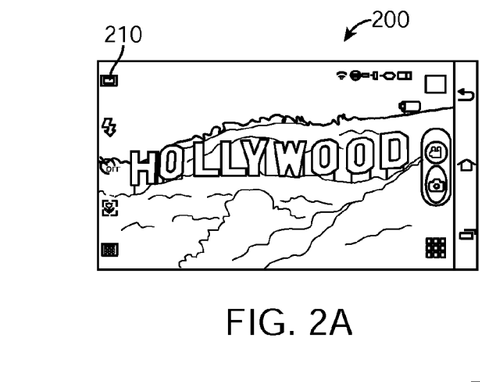
FIGS. 2A-E shows examples of selecting a reference photo for using reference photo setting information for taking a photo image of a current framed image with an electronic device, according to an embodiment.
Figure 2B:
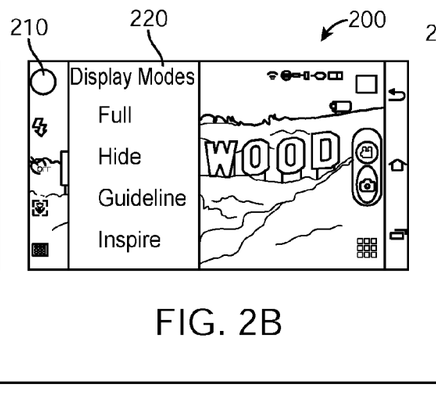

As illustrated in FIG. 2A, in one embodiment, a displayed current frame 200 shows an image, such as the famous "Hollywood" sign in California. The current frame display 200 includes a live view tab 210. In FIG. 2B, a user taps on the live view tab 210 using the touch screen 24 and a menu 220 appears. In one embodiment, the menu 220 includes options, such as different display modes (e.g., full, hide, guideline, and inspire).

Figure 2C:
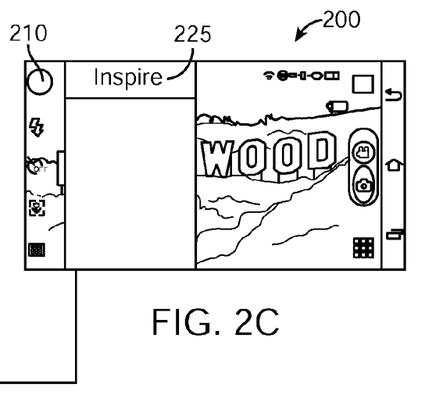
Figure 2D:
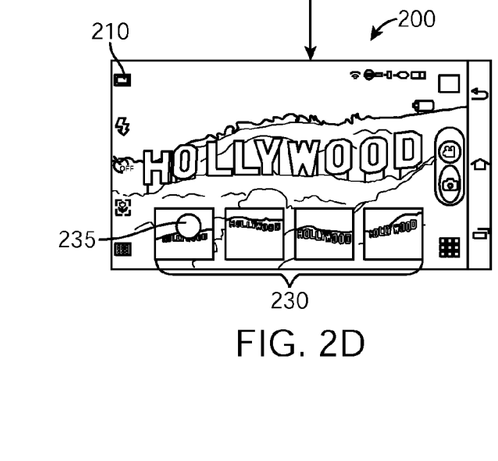
Figure 2E:
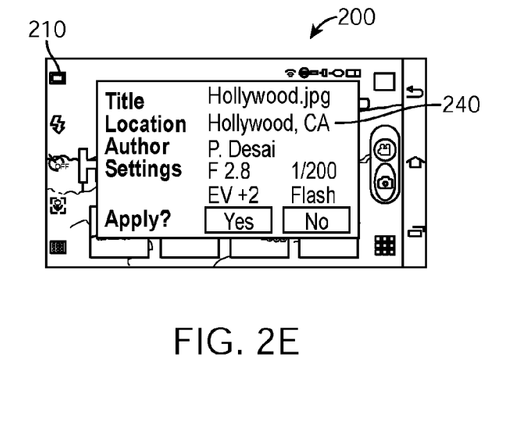

FIG. 2C shows the display 200 after a user tapped and swiped the display using the touch screen 24 to highlight and select the inspire mode 225. FIG. 2D shows the display 200 that shows inspirational photo images 230 shown as a row of thumbnails on the lower portion of the display 200. As illustrated, the first inspirational photo image 235 is tapped on for selection and showing photo settings. FIG. 2E shows the camera settings 240 that were used in photographing the inspirational photo image 235. The user may then determine whether to apply the camera settings from the inspirational photo image 235 to the current framed image shown on the display 200. The use of the inspire mode 225 may be made without having to leave the live view display 200, which assists users in taking photos without having to look up information, determine settings based on lighting, angles, position, etc.

In one embodiment, a user aims an image capture device of a mobile device (e.g., smartphone, tablet, smart device) including the imaging inspirational module 11, towards a target object/subject, for example, an object, scene or person(s) at a physical location, such as a city center, attraction, event, etc. that the user is visiting and may use an inspirational photo image for automatically changing the camera settings for taking a new photo. The photo from the camera application (e.g., camera module 15) is processed by the mobile device 20 and displayed on a display 21 of the mobile device 20. In one embodiment, the new photo image may then be shared (e.g., emailing, text messaging, uploading/pushing to a network, etc.) with others as desired.

Figure 3:
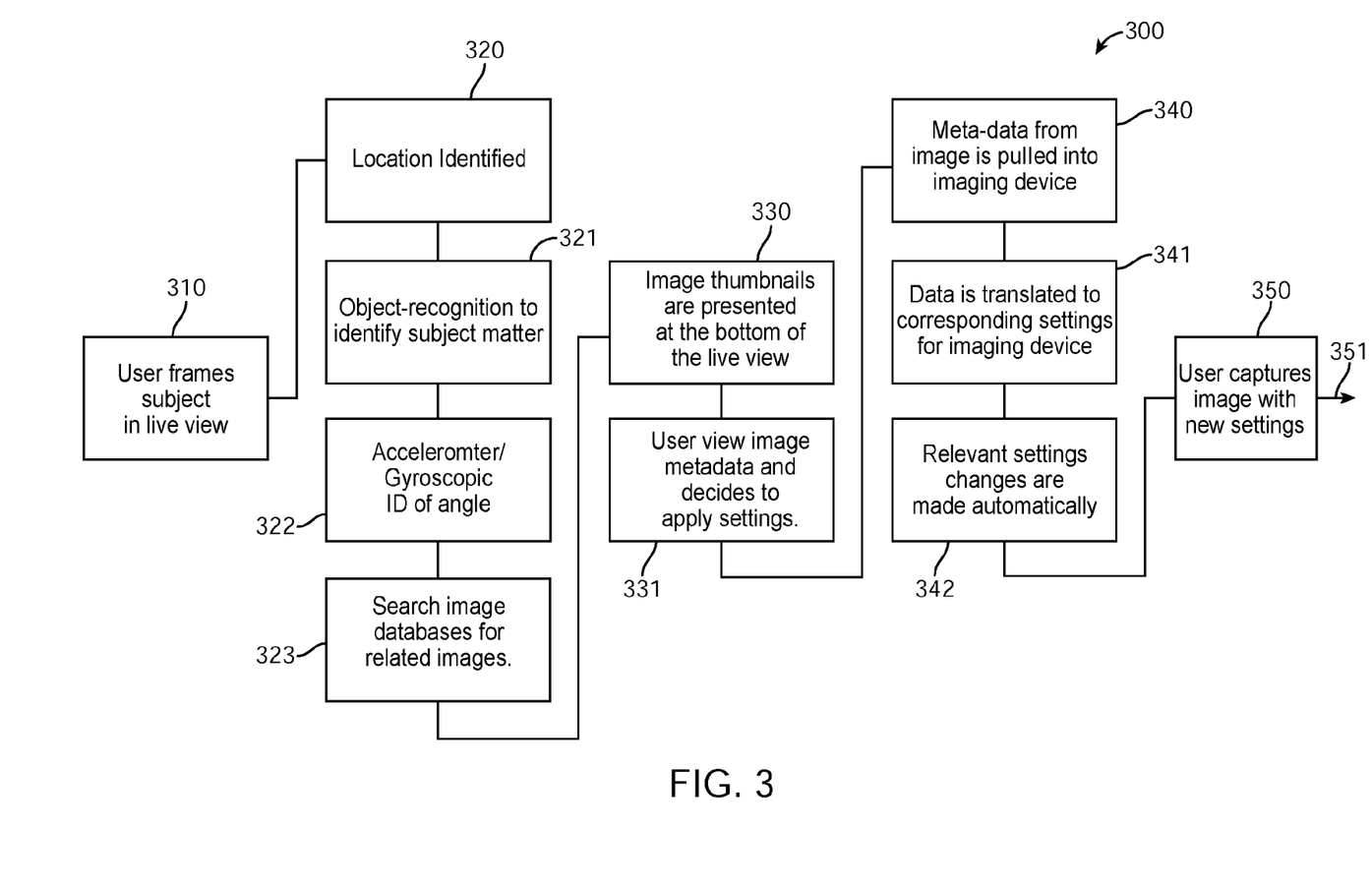
FIG. 3 shows a flowchart of a process for reference photo setting information for taking a photo image of a current framed image with an electronic device, according to an embodiment.

FIG. 3 shows a flowchart of using reference photo setting information for taking a photo image of a current framed image process 300, according to an embodiment. Process block 310 comprises using an electronic device for framing an image in a live view display. Process block 320 comprises identifying the location of the framed image. Process block 321 comprises identifying the subject matter of the framed image using object-recognition. Process block 322 comprises determining the identification of the angle of the framed image (i.e., camera angle) using accelerometer/gyroscopic information. Process block 323 comprises searching photo image databases and sources for related photo images. Process block 330 comprises presenting image thumbnails for the related preexisting photo images on the live view display showing the current framed subject matter. Process block 331 comprises viewing camera settings metadata of a selected preexisting photo image and making a selection of whether to accept the camera settings for the currently viewed subject matter in the current frame.

Process block 340 comprises pulling the metadata information from the selected related photo image as current camera settings for the electronic device. Process block 341 comprises translating the metadata camera settings for use by the image capture device of electronic device. Process block 342 comprises automatically changing the current camera settings of the electronic device based on the selected related photo image camera settings. Process block 350 comprises capturing the currently framed subject matter with the image capture device of the electronic device. Arrow 351 comprises storing the captured photo in a memory of the electronic device or sending the photo via text message, emailing, etc.

Figure 4:
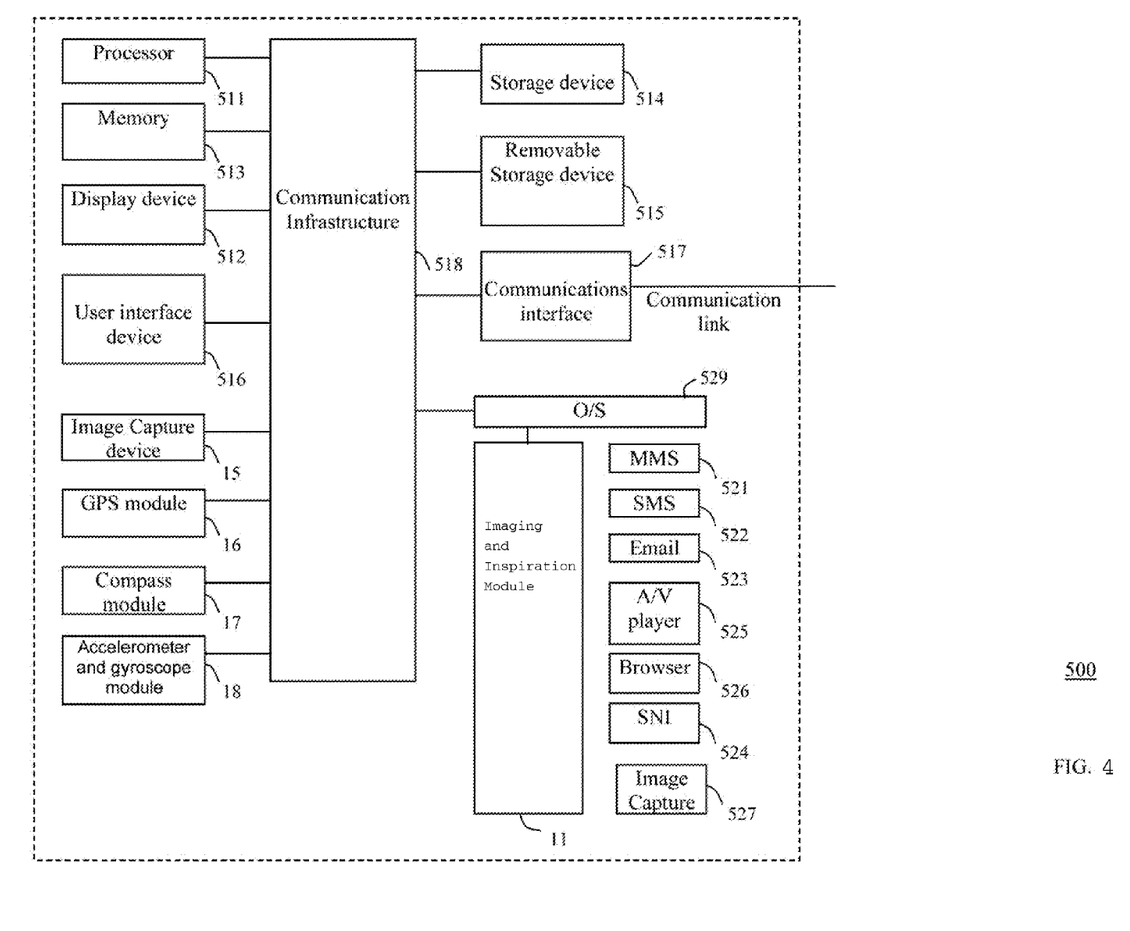
FIG. 4 is a high-level block diagram showing an information processing system comprising a computing system implementing an embodiment.

FIG. 4 is a high-level block diagram showing an information processing system comprising a computing system 500 implementing an embodiment. The system 500 includes one or more processors 511 (e.g., ASIC, CPU, etc.), and can further include an electronic display device 512 (for displaying graphics, text, and other data), a main memory 513 (e.g., random access memory (RAM)), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as WiFi, Cellular), a network interface (such as an Ethernet card), a communications port, or a PCMCIA slot and card). The communication interface 517 allows software and data to be transferred between the computer system and external devices. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation, in a mobile wireless device such as a mobile phone, the system 500 further includes an image capture device such as a camera 15. The system 500 may further include application modules as MMS module 521, SMS module 522, email module 523, social network interface (SNI) module 524, audio/video (AV) player 525, web browser 526, image capture module 527, etc.

The system 500 further includes an imaging and inspiration module 11 as described herein, according to an embodiment. In one implementation of said imaging and inspiration module 11 along with an operating system 529 may be implemented as executable code residing in a memory of the system 500. In another embodiment, such modules are in firmware, etc.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

Embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instruc-

What is claimed is:

1. A method of using reference photo setting information for taking a photo image of a current framed image, comprising:
   displaying a framed image from an image capture device of an electronic device;
   performing object recognition for the framed image on a display of the electronic device;
   identifying location information for the electronic device;
   presenting one or more reference images related to the framed image based on one or more of the identified location information and object recognition;
   selecting one of the reference images; and
   using photo setting information used for capturing the selected reference image for capturing the framed image.

2. The method of claim 1, further comprising:
   determining angle information for the framed image; and
   searching image databases for the one or more reference images based on the identified location information, object recognition and angle information.

3. The method of claim 2, wherein performing object recognition comprises:
   identifying subject matter of the framed image.

4. The method of claim 3, further comprising:
   pulling the photo setting information into the electronic device;
   translating the photo setting information from the selected reference image to photo setting information for the image capture device;
   automatically changing photo settings of the image capture device; and
   capturing the framed image using the changed photo settings.

5. The method of claim 4, wherein the one or more reference images are displayed as a row of thumbnail images.

6. The method of claim 5, wherein the photo setting information comprises image metadata of the selected reference image.

7. The method of claim 4, further comprising displaying the image metadata of the selected reference image.

8. The method of claim 1, wherein the photo setting information comprises one or more of orientation, aperture, shutter speed, focal length, metering mode, and International Standard Organization (ISO) speed information.

9. The method of claim 1, wherein the electronic device comprises a mobile electronic device.

10. The method of claim 9, wherein the mobile electronic device comprises a mobile phone.

11. An electronic device, comprising:
    an image capture device;
    a display; and
    an imaging inspiration processor configured to provide photo setting information used for capturing a reference photo image for capturing a current framed image via the image capture device of the electronic device;
    wherein the imaging inspiration processor is further configured to:
    identify location information of the electronic device, perform object recognition of subject matter of the current framed image, search for reference photo images related to the current framed image, and present reference photo images found from the search for selection for providing the photo setting information used for capturing the reference photo image for capturing the current framed image.

12. The electronic device of claim 11, wherein the imaging inspiration processor is further configured to determine angle information for the current framed image; and searches databases for reference images based on the identified location information, object recognition of subject matter, and angle information.

13. The electronic device of claim 12, wherein the imaging inspiration processor is further configured to translate the photo setting information from the selected reference image to photo setting information for the image capture device, automatically changes photo settings of the image capture device, and captures the current framed image using the changed photo settings.

14. The electronic device of claim 13, wherein the imaging inspiration processor is further configured to arrange the reference images as a row of thumbnails.

15. The electronic device of claim 13, wherein the photo setting information comprises image metadata of the selected reference image.

16. The electronic device of claim 15, wherein the image metadata of the reference image is provided on the display.

17. The electronic device of claim 11, wherein the electronic device comprises a mobile electronic device.

18. A non-transitory computer-readable medium having instructions which when executed on a computer perform a method comprising:
    displaying a framed image from an image capture device of an electronic device;
    performing object recognition for the framed image on a display of the electronic device;
    identifying location information for the electronic device;
    presenting one or more reference images related to the framed image based on one or more of the identified location information and object recognition;
    selecting one of the reference images; and
    using photo setting information used for capturing the selected reference image for capturing the framed image.

19. The medium of claim 18, further comprising:
    determining angle information for the framed image; and
    searching image databases for the one or more reference images based on the identified location information, object recognition, and angle information.

20. The medium of claim 19, wherein performing object recognition comprises identifying subject matter of the framed image.

21. The medium of claim 20, further comprising:
    pulling the photo setting information into the electronic device;
    translating the photo setting information from the selected reference image to photo setting information for the image capture device;
    automatically changing photo settings of the image capture device; and
    capturing the framed image using the changed photo settings.

22. The medium of claim 21, wherein the one or more reference images are displayed as a row of thumbnail images, and the photo setting information comprises image metadata of the selected reference image.

23. The medium of claim 22, further comprising displaying the image metadata of the reference image.

24. The medium of claim 18, wherein the electronic device comprises a mobile electronic device.

25. A method for presenting a graphical user interface (GUI) on a display of an electronic device, comprising:
   framing an image prior to capturing by an image capture device of the electronic device;
   determining one or more selectable reference images related to the framed image based on one or more of identified location information and object recognition;
   selecting a particular reference image; and
   upon selection of the particular reference image, displaying photo setting information on the GUI for use in capturing the framed image.

26. The method of claim 25, wherein the one or more selectable reference images are displayed as thumbnails on the framed image.

\* \* \* \* \*